June 24, 1958        P. MÜLLER        2,840,685
METHOD OF ELECTROWELDING AND PRODUCTS MADE THEREBY
Filed Nov. 9, 1955        2 Sheets-Sheet 1
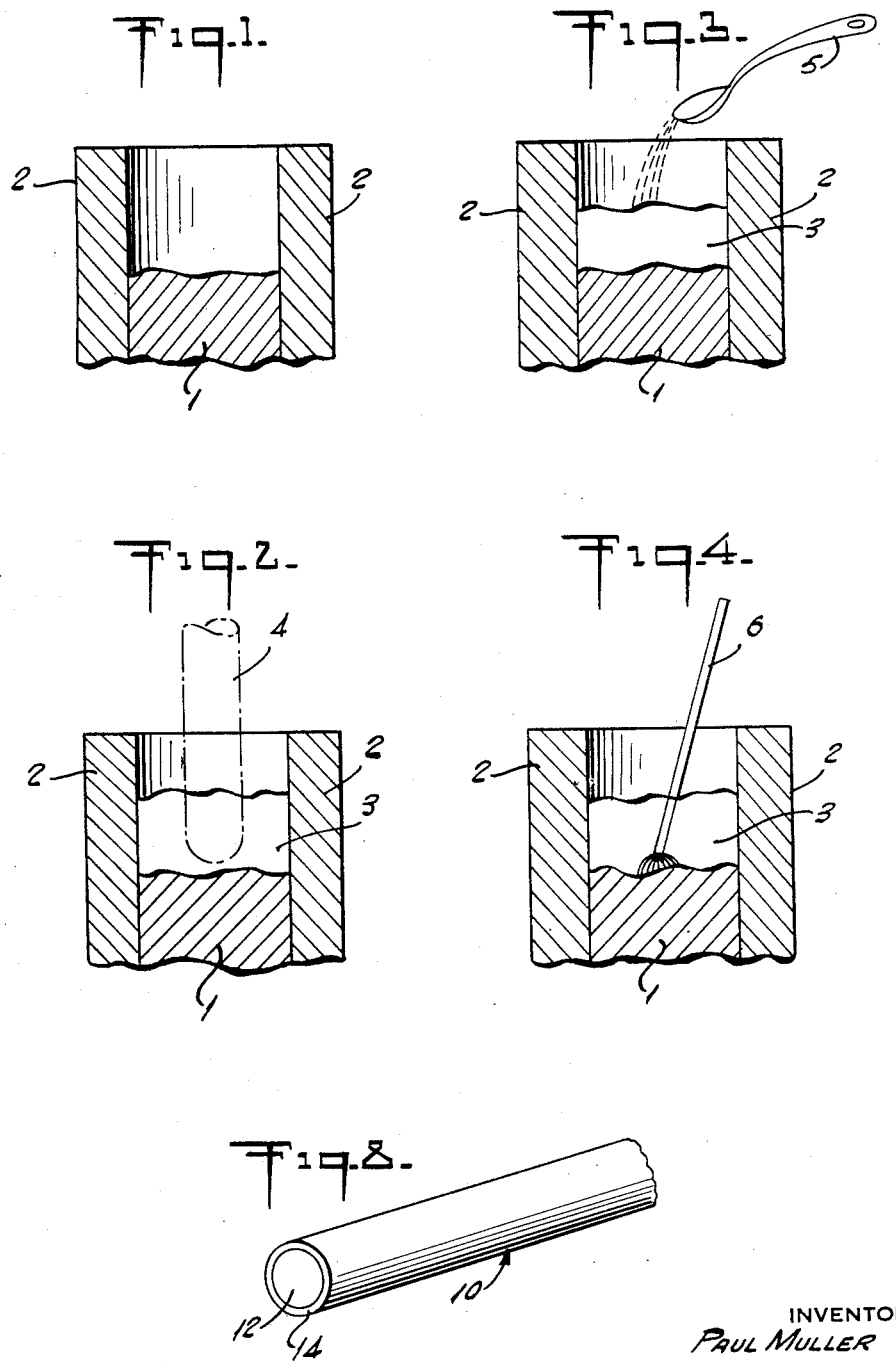
INVENTOR
PAUL MULLER June 24, 1958     P. MÜLLER     2,840,685
METHOD OF ELECTROWELDING AND PRODUCTS MADE THEREBY
Filed Nov. 9, 1955     2 Sheets-Sheet 2
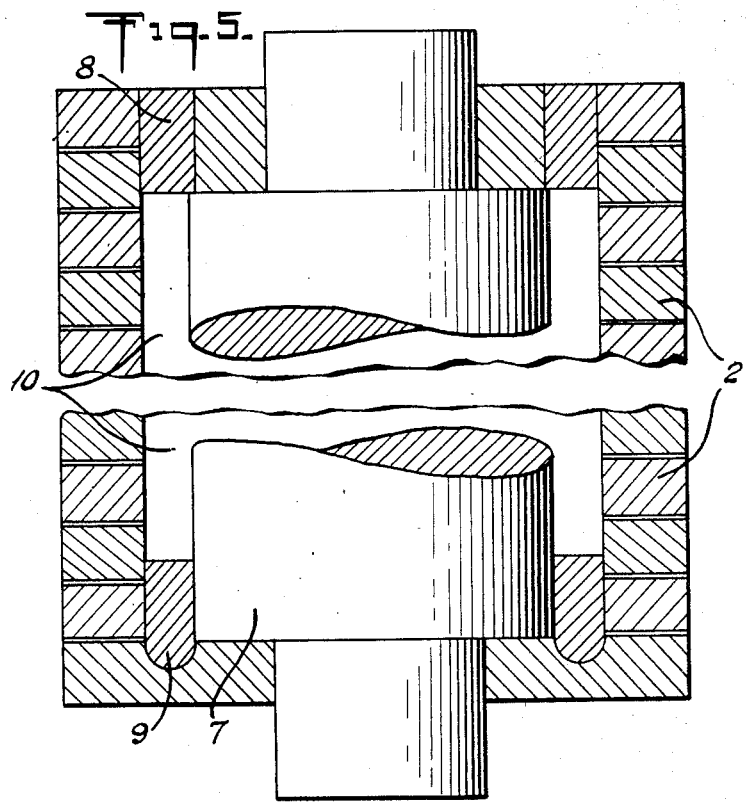
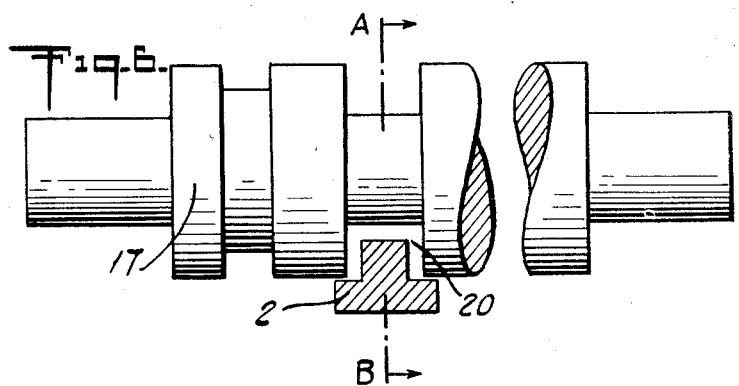
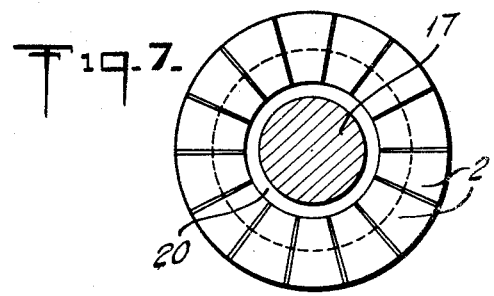
INVENTOR
PAUL MULLER United States Patent Office 2,840,685
Patented June 24, 1958

2,840,685

METHOD OF ELECTROWELDING AND PRODUCTS MADE THEREBY

Paul Müller, Halle (Saale), Germany, assignor to VEB (K) Schweisswerk Halle, Halle (Saale), Germany Application November 9, 1955, Serial No. 545,948

9 Claims. (Cl. 219—73)

This invention relates to the welding of metal parts, and more particularly to the build-up and repair electrowelding of parts made of cast iron, especially of cast iron chilled rollers and wobblers, wherein slag in the form of powder is applied to the preheated place of welding which is recessed or placed into a mold.

The hitherto customary so-called "Ellira" (Electro-Linde-Rapid) method of welding is one of the methods wherein the welding is performed under a layer of powder. The so-called "Ellira Casting" relates to a method of welding wherein joint weldings or repair weldings or build-up weldings are made on cast steel under a layer of slag; said known method, however, requires a continuous removal of the partly solidified viscous slag and a continuous supply of fresh powder. It is still impossible to weld gray cast iron, especially special cast iron, used for example in cast iron chilled rollers, according to said "Ellira" method.

In the book "Werkstoff und Schweissung" by Erdmann-Jessnitzer, vol. I., page 476, it is mentioned that in the "Ellira Casting" process, Ellira powder of selected grain size is continuously poured on the casting area, while partly solidified slag is removed from the bath, since it would disturb the casting process. On page 502 of the same volume it is stated that it is possible to weld in addition to non-alloy steel (i. e. steels with low carbon content), also alloy steels, particularly electro-steels with low carbon content. It is further mentioned that it is possible to weld higher carbon content steels and alloy steels, for example chromium-molybdenum steel with a 0.40% carbon content.

Practical experience in welding such types of steel is very scant. No success has yet been achieved in utilizing the above method in welding cast iron, whose carbon content is in any event higher than in the aforementioned types of steel. This is particularly true of special cast iron, for example chilled iron casting and cast iron chilled rollers.

Because of the failure to produce high-grade results with the known cast iron welding method in the welding of special cast iron, for example cast iron with higher tensile strength and cast iron used for rollers, the process of the invention has been developed.

According to the invention, before the addition of cast-iron material, a layer of slag-powder is applied and liquified by an electric arc which burns between a carbon electrode partially immersed in the powder, and the slag powder itself. Alternately, an already liquified slag powder bath is applied, but again, before the addition of the cast-iron material which may be applied by a metal electrode. During the entire coating process, the slag bath is maintained in liquid state without the necessity of wholly or partially renewing it, except for the replenishment of losses during the operation.

It is an object of the invention to render possible the welding of gray cast iron especially of special gray cast iron and to obtain a built-up structure being free from slag inclusions, being highly uniform and fine grained, and being capable of withstanding high thermic and mechanical strains.

Another object of the invention is to improve on the art of electrowelding as now customarily performed.

Other objects and details of the invention will be apparent from the following description when read in conjunction with the accompanying drawings forming part of this specification, wherein:

Fig. 1 is a schematic sectional view showing a broken-off piece to be welded, and a mold surrounding the same;

Fig. 2 is a similar sectional view showing a layer of slag powder added to the mold and melted by an electrode;

Fig. 3 is a similar sectional view showing the addition of slag to the melted powder;

Fig. 4 is a similar sectional view showing the introduction of a welding electrode to the liquid slag;

Fig. 5 is an enlarged cross-sectional view of the mold, built up in sections, with a worn roller disposed vertically therein;

Fig. 6 is a schematic sectional view showing a roller in horizontal position within a mold for the manufacture of a new roller;

Fig. 7 is a section taken along line A—B of Fig. 6; and

Fig. 8 is a perspective view of an article made in accordance with the invention.

As will be described hereinafter in detail, in accordance with the invention a slag powder having a melting point lower than that of the base material is used and said slag powder is completely liquefied preferably by means of a carbon arc, prior to the welding of the base material with the additional material or filler material.

According to a further feature of the invention, the additional material or filler material used in the method is of the same or similar nature as the base material. Thus, the entire body obtained by a repair or build-up welding according to the invention obtains a homogeneous structure of especially fine grain, which may withstand high thermic and mechanical strains.

The method according to the invention may also be used for the build-up welding of worn cast iron chilled rollers. Preferably, in such a case, the roller is placed in a vertical position during the welding. At first a ring having a wall of the required thickness is welded to the lower end of the roller by means of an annular mold and the simultaneous use of a plurality of electrodes distributed along the circumference of the roller. Thereafter a new covering is built up on the roller by means of an intermittent or continuous advancing of the annular mold or building-up of the casing of the annular mold and by a subsequent welding.

Fig. 5 illustrates the method of the invention as utilized for the build-up welding of worn cast iron chilled rollers. In this view the roller 7 is placed in a vertical position, with numeral 8 representing the lost or broken-off head. The annular mold surrounding the roller is built-up by the addition of mold sections 2 as the covering is built-up by welding. The mold has a welding gap 20 and welding sump 9.

The method according to the invention, however, is not limited to the repair of worn rollers. If desired, the method according to the invention may also be used for the manufacture of new rollers by welding a layer of chilled cast iron onto blanks of steel, cast steel or gray cast iron.

If desired, such a blank, used for the manufacture of a new roller, may be placed in a horizontal position into a stable rotary device, which permits an intermittent rotation of said blank. Substantially rectangular blocks are welded onto the blank by means of casting boxes placed onto the blank, said casting boxes extending in axial direction. After the welding-on of each block the blank is rotated through a suitable angle of rotation, so that a new casting box may be placed onto the top of the blank and may be filled with welding material. This method is continued until the blocks welded onto the blank form a continuous or coherent cylindrical casing having an outer diameter corresponding to the desired diameter of the roller. Figs. 6 and 7 show the horizontally-positioned shaped roller 17, the welding gap 20 and the mold 2, utilized for the manufacture of a new roller in accordance with the method of the invention.

Thus a roller is obtained having a core of high value, said core being capable of withstanding high mechanical strains, even if it is simultaneously subjected to thermic strains. Owing to the build-up welding according to the invention, as an additional feature the covering of such a roller has a fine-grained, porous structure free from slags and capable of resistance to strains, said structure being likewise capable of withstanding high thermic and mechanical strains; it should be taken into consideration that the portions of the roller welded onto the core have said excellent properties not only in their outer surface but throughout all of their layers.

A roller made in accordance with above described method is shown in Fig. 8 of the drawings. The roller generally indicated by 10, has a metal core 12 of steel, cast steel or gray cast iron and a metal layer 14 surrounding said core 12 and being welded onto the latter. Said metal layer 14 may consist of chilled cast iron.

If used rollers are paired in accordance with the invention, the place of fracture of said used rollers is heated up to approximately 600°–700° C. Then a mold corresponding to the profile of the roller at the place of fracture is placed onto the roller whereupon slag of any suitable kind is applied to the place of fracture. Thereafter the layer of slag is pierced by a welding electrode or carbon electrode for the formation of an arc. The build-up welding proper of the additional material to the bare material takes place only after a complete liquefying of the slag; in this connection it is of importance that the melting point of the slag is lower than the melting point of the base material. Preferably, the additional material used for the method according to the invention is of the same or a similar nature as the base material.

Figs. 1 through 4 illustrate diagrammatically the method mentioned above. In Fig. 1, a mold 2 is shown applied to the broken-off roller 1 to be repaired. In Fig. 2 a layer of powder 3 has been applied to the mold above the place of fracture of the roller 1, and the powder 3 is liquified by a carbon electrode 4. The slag is added by a slag-pouring spoon or ladle 5, as shown in Fig. 3. Fig. 4 shows the final welding process by the second electrode 6.

The welding material to be added (and which should be of similar material to the parts to be welded), can be added by cast iron electrodes, or there may be used several electrodes made of dissimilar material whose composite molten product is cast iron. Coated welding rods can also be applied in the known manner.

Obviously, the transformation of the electrical energy into heat results not only from direct heating by the arc, but also in part from resistive heating by the slag bath.

A particular advantage lies in the fact that the advantages of the steel roller and of the cast-iron roller are utilized, while at the same time, the disadvantages of both rollers are omitted. The steel roller has good torsion and bending strength. The steel roller is used as the steel core of a new roller. The cast-iron roller has favorable wear resistance. A core of cast steel will therefore be used on which an envelope of ledeburitic cast iron will be applied so that the new roller will have only good properties as outlined above, which is an improvement over the old roller.

I have described preferred steps of my invention and preferred embodiments thereof, but it is understood that the disclosure is for the purpose of illustration and that various omissions or changes in the steps of the method and in the shape, proportion and arrangement of parts, as well as the substitution of equivalent steps or elements for these herein described, may be made without departing from the spirit and scope of the invention as set forth in the appended claims.

What I claim is:

1. A method of welding with an entirely covered or substantially covered electric arc on ferrous base pieces, particularly cast iron chilled rollers and wobblers, said method comprising the steps of preheating a welding area of the cast iron base to 600°–700° C., applying a layer of liquefied slag-powder of a melting point below that of the cast iron base to said preheated welding area, inserting an arc-producing electrode comprising cast iron metal in said slag bath, and then initiating the arc casting by firing an electric arc between said metal electrode and the work piece, said liquid slag layer being maintained during the entire welding process without withdrawing any of said slag.

2. A method of welding according to claim 1, in which a plurality of arc producing metal electrodes of dissimilar material are used whose composite molten material is cast iron, and the work piece is a metal core selected from the group of steel, cast steel, and gray cast iron, whereby a layer of chilled cast iron is formed by welding on said core.

3. A method of welding with an entirely or substantially covered electric arc on ferrous base members, particularly cast iron chilled rollers and wobblers, said method comprising the steps of preheating a welding area of the cast iron base, applying to said preheated welding area a layer of a slag powder having a melting point below that of said cast iron, immersing a carbon electrode at least partially into said slag powder to produce an electric arc between the carbon electrode and the slag powder, thereby liquefying the slag powder entirely, and then adding cast iron welding material to the welding area by firing an electric arc between a metal electrode and the work piece, thereby welding cast iron onto said base while maintaining the liquid slag bath during the entire welding process without withdrawing any of the slag.

4. A method as in claim 3 wherein the preheating is accomplished to 600–700 degrees C.

5. A method as in claim 3 in which the cast iron welding material is added as the composite molten product of a plurality of dissimilar metal electrodes between which and the work piece electric arcs are fired.

6. A method of electro-welding cast iron onto a base member of a ferrous material, said method comprising the steps of preheating the welding area of said base member to 600–700 degrees C, applying to the welding area of said base, a slag powder layer of a melting point lower than that of cast iron, liquefying the slag powder entirely by means of an electric arc between said slag and a carbon electrode, and welding cast iron from a metal electrode onto said base by an electric arc produced underneath said liquid slag layer between said metal electrode and said base.

7. A method of welding cast iron on a substantially roller-shaped member of ferrous material comprising the steps of preheating said roller, placing it in a substantially vertical position with its lower end into a mold encompassing said lower roller end in spaced relationship thereto, applying a layer of slag powder having a melting point lower than cast iron within said mold, immersing a carbon electrode at least partially into said slag powder, producing an electric arc between the carbon electrode and said slag powder thereby liquefying said slag powder entirely, then adding cast iron welding material underneath said liquid layer by striking an electric arc between said roller end and a metal electrode so as to weld a cast iron ring to said roller end, progressively increasing the height of the wall of said mold, and welding further rings of cast iron under the liquefied slag on said cast iron ring and the surface of said roller.

8. A method as in claim 7 wherein a plurality of metal electrodes are distributed along the circumference of the roller to produce said cast iron rings.

9. A method of welding cast iron on a cylindrical core member of ferrous material comprising the steps of preheating said core member, placing it in a substantially horizontal position, placing an elongated mold box on the top portion and lengthwise of said core, applying a layer of slag powder having a melting point lower than cast iron within said mold, immersing a carbon electrode at least partially into said slag powder, producing an electric arc between the carbon electrode and said slag powder, thereby liquefying said slag powder entirely, then adding cast iron welding material underneath said liquid layer by striking an electric arc between said core and a metal electrode, removing said mold, turning said core member an angle according to the width of the casting produced on the core, placing the mold on the side of said first casting, repeating the application and liquefaction of slag and the addition of cast iron, and continuing the application of the said steps so as to form a continuous casting cylinder.

References Cited in the file of this patent

UNITED STATES PATENTS

| | | |
|---|---|---|
| Re.19,764 | Frickey | Nov. 26, 1935 |
| 1,416,879 | Rousseau | May 23, 1922 |
| 1,630,631 | Pauly | May 31, 1927 |
| 1,679,518 | Fowle | Aug. 7, 1928 |
| 1,782,316 | Robinoff et al. | Nov. 18, 1930 |
| 2,125,172 | Kinzel | July 26, 1938 |
| 2,219,352 | Andrus | Oct. 29, 1940 |
| 2,227,193 | Maxwell | Dec. 31, 1940 |
| 2,241,572 | Armstrong | May 13, 1941 |
| 2,277,654 | Merlub-Sobel et al. | Mar. 24, 1942 |
| 2,299,747 | Harter | Oct. 27, 1942 |
| 2,330,289 | Keir | Sept. 28, 1943 |
| 2,395,723 | Chmielewski | Feb. 26, 1946 |